United States Patent
Lin et al.

(10) Patent No.: US 8,363,369 B2
(45) Date of Patent: Jan. 29, 2013

(54) SHORT CIRCUIT AND OPEN CIRCUIT PROTECTION FOR A BOOST CONVERTER

(75) Inventors: Shui-Mu Lin, Longjing Township, Taichung County (TW); Ti-Ti Liu, Taipei (TW); Huan-Chien Yang, Pingtung (TW)

(73) Assignee: Richtek Technology Corp., Hsinchu (TW)

(*) Notice: Subject to any disclaimer, the term of this patent is extended or adjusted under 35 U.S.C. 154(b) by 450 days.

(21) Appl. No.: 12/591,381

(22) Filed: Nov. 18, 2009

(65) Prior Publication Data
US 2010/0123978 A1   May 20, 2010

(30) Foreign Application Priority Data
Nov. 20, 2008   (TW) ............................... 97144839 A (51) Int. Cl.
*H02H 3/20*   (2006.01)
*H02H 9/04*   (2006.01)

(52) U.S. Cl. ..................................... 361/91.1; 361/91.5
(58) Field of Classification Search ................. 361/91.1, 361/91.5
See application file for complete search history.

(56) References Cited

U.S. PATENT DOCUMENTS

| 7,760,479 B2* | 7/2010 | Garrett | 361/93.9 |
| 2003/0020442 A1* | 1/2003 | Hwang | 323/288 |

* cited by examiner

*Primary Examiner* — Dharti Patel
(74) *Attorney, Agent, or Firm* — Muncy, Geissler, Olds & Lowe, PLLC (57) ABSTRACT

A boost converter includes a load disconnect switch connected between a voltage input terminal and an inductor, a power switch connected to the inductor by a switching node, a diode connected between the switching node and a voltage output terminal, and an output capacitor connected to the voltage output terminal to provide an output voltage. A protection apparatus is connected to the load disconnect switch, switching node and power switch to monitor the voltage at the switching node and the output voltage to provide open circuit and short circuit protection for the boost converter.

31 Claims, 11 Drawing Sheets

SHORT CIRCUIT AND OPEN CIRCUIT PROTECTION FOR A BOOST CONVERTER

FIELD OF THE INVENTION

The present invention is related generally to boost converters and, more particularly, to short circuit and open circuit protection for a boost converter.

BACKGROUND OF THE INVENTION

Figure 1:
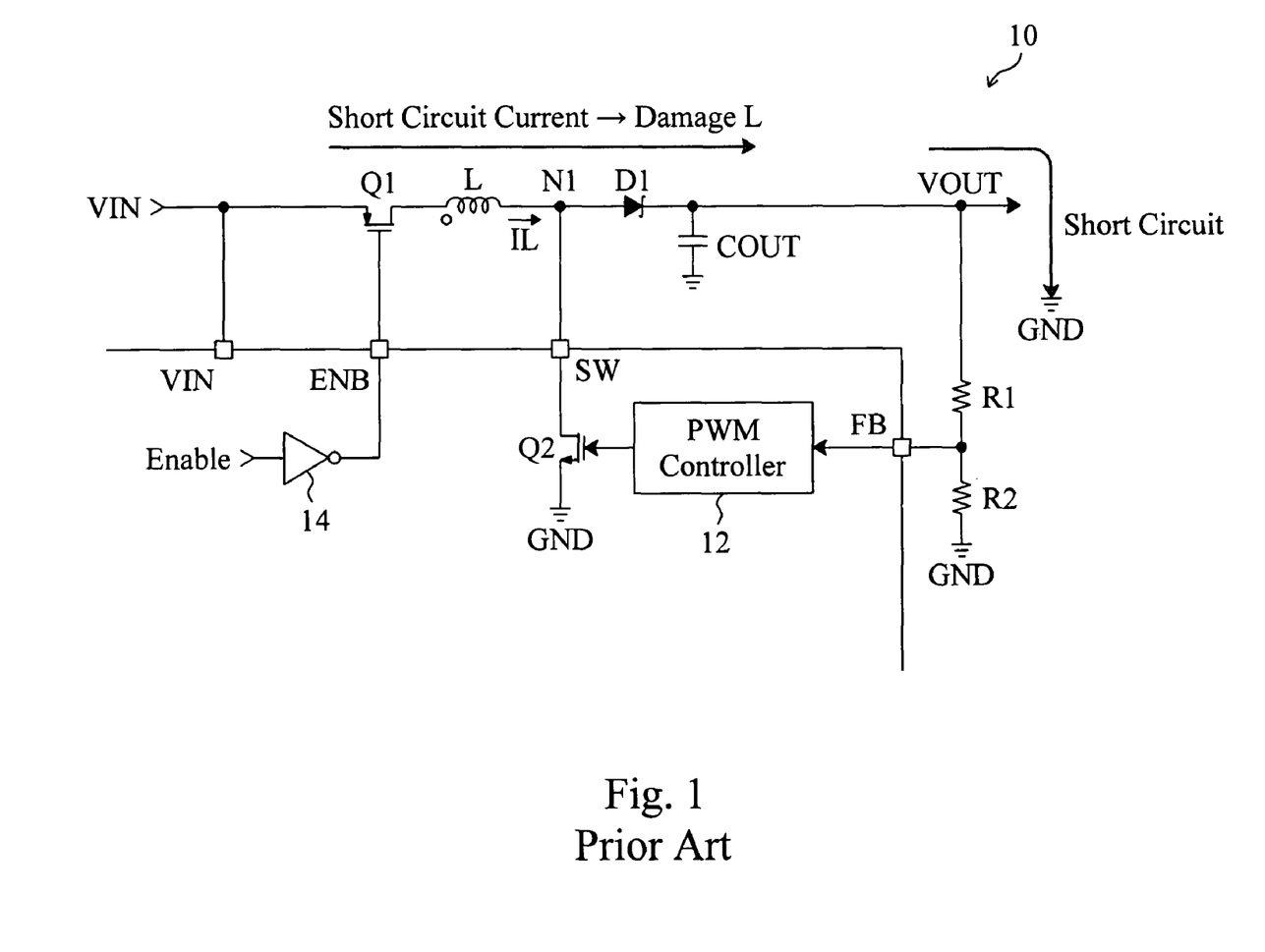
FIG. 1 is a circuit diagram of a conventional boost converter.

As shown in FIG. 1, a conventional boost converter 10 includes a load disconnect switch Q1 connected between a voltage input terminal VIN and an inductor L, a diode D1 connected between the inductor L and a voltage output terminal VOUT, a power switch Q2 connected between a switching node N1 and a ground terminal GND, an output capacitor COUT connected to the voltage output terminal VOUT, and voltage divider resistors R1 and R2 serially connected between the voltage output terminal VOUT and ground terminal GND to divide an output voltage VOUT to provide a feedback voltage FB, and a pulse width modulation (PWM) controller 12 switches the power switch Q2 according to the feedback voltage FB. When the boost converter 10 starts up, an enable signal Enable turns on the load disconnect switch Q1 by an inverter 14 to connect the inductor L to the voltage input terminal VIN, so as to allow the input voltage VIN being converted into the output voltage VOUT by switching the power switch 12 according to the feedback voltage FB by the PWM controller 14.

Figure 2:
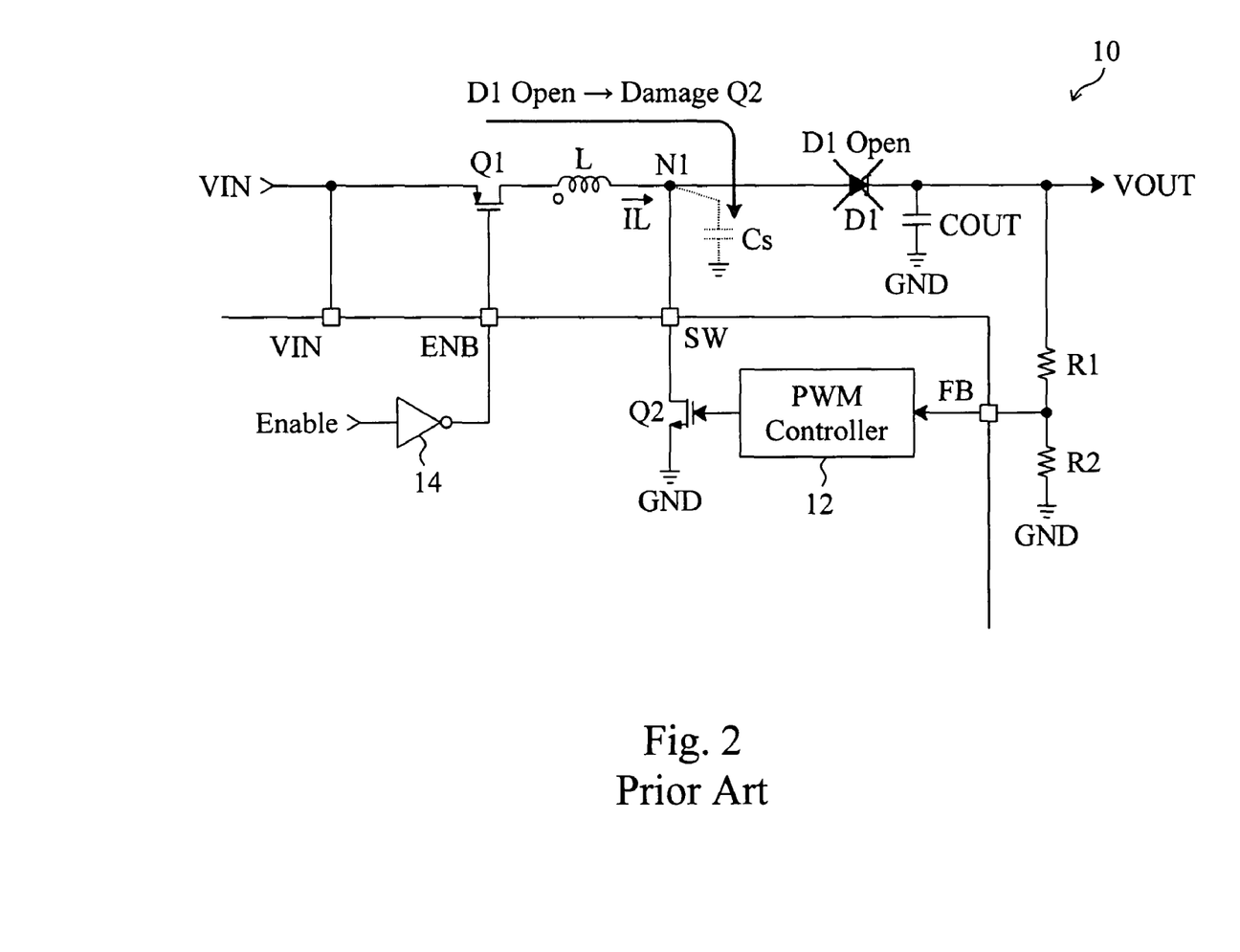
FIG. 2 is a circuit diagram showing diode open circuit occurs in the boost converter of FIG. 1.

At the moment the boost converter 10 starts up, the output voltage VOUT is zero and therefore a large inductor current IL will be instantly produced that charges the output capacitor COUT, resulting in a huge inrush. On the other hand, some components of the boost converter 10 may become short circuit or open circuit, thereby damaging certain components. For example, when the voltage output terminal VOUT is short to ground, a large short circuit current will be produced that flows through the inductor L to the voltage output terminal VOUT, and may damage the inductor L. In another case, as shown in FIG. 2, if the diode D1 becomes open circuit, the inductor current IL will charge the stray capacitor Cs at the switching node N1. Because the stray capacitance Cs is very small, the voltage at the switching node N1 may be raised instantly to a very high level and thus damage the power switch Q2.

Therefore, it is desired apparatus and methods for short circuit and open circuit protection for a boost converter.

SUMMARY OF THE INVENTION

An object of the present invention is to provide apparatus and methods for preventing a boost converter from short circuit and open circuit damages.

A boost converter includes a load disconnect switch connected between a voltage input terminal and an inductor, a power switch connected to the inductor by a switching node, a diode connected between the switching node and a voltage output terminal, an output capacitor connected to the voltage output terminal to provide an output voltage, and a resistor voltage divider connected to the voltage output terminal to produce a feedback voltage related to the output voltage. A protection apparatus includes a fault protection circuit connected to the load disconnect switch to switch the load disconnect switch, an over-voltage protection circuit connected to the switching node, power switch and fault protection circuit, an over-current protection circuit connected to the power switch and fault protection circuit, a first detector connected to the switching node and fault protection circuit to monitor the voltage at the switching node, a second detector connected to the resistor voltage divider and fault protection circuit to monitor the feedback voltage, a third detector connected to the resistor voltage divider and over-voltage protection circuit to monitor the feedback voltage, a current source connected to the switching node and fault protection circuit, a timer connected to the fault protection circuit, and a second diode connected to a node between the load disconnect switch and inductor.

When the boost converter starts up, the fault protection circuit keeps the load disconnect switch off and signals the current source to charge the switching node. Once the voltage at the switching node becomes greater than a voltage threshold, the fault protection circuit turns on the load disconnect switch. Therefore, the inrush of the inductor current at startup is reduced or eliminated.

For diode open circuit protection, the over-voltage protection circuit monitors the voltage at the switching node and when the voltage at the switching node becomes higher than an over-voltage threshold, the over-voltage protection circuit turns on the power switch and signals the fault protection circuit to turn off the load disconnect switch. After the fault protection circuit turns off the load disconnect switch, the current source provides a pre-charge current to charge the switching node, the timer counts the charge time during which the current source charges the switching node, and before the charge time reaches a time threshold, if the voltage at the switching node is greater than a first voltage threshold, and the feedback voltage is lower than a second voltage threshold, the fault protection circuit keeps the load disconnect switch off.

For diode short circuit protection, the over-current protection circuit signals the fault protection circuit to turn off the load disconnect switch when the current in the power switch becomes greater than an over-current threshold, and after the fault protection circuit turns off the load disconnect switch, the second detector will signal the fault protection circuit to keep the load disconnect switch off when the feedback voltage becomes lower than a voltage threshold.

For output capacitor open circuit protection, during the power switch is off, when the voltage at the switching node increases to an over-voltage threshold or the feedback voltage becomes higher than a voltage threshold, the over-voltage protection circuit turns on the power switch and signals the fault protection circuit to turn off the load disconnect switch. After the fault protection circuit turns off the load disconnect switch, the current source provides a pre-charge current to charge the switching node, the timer counts the charge time during which the current source charges the switching node, and if, before the charge time reaches a time threshold, the voltage at the switching node is greater than a second voltage threshold and the feedback voltage is greater than a third voltage threshold, the fault protection circuit keeps the load disconnect switch off.

For protection to the voltage output terminal, output capacitor or switching node short to ground, when the voltage at the switching node is lower than a first voltage threshold during the power switch is off, the first detector signals the fault protection circuit to turn off the load disconnect switch, and the second detector compares the feedback voltage with a second voltage threshold to inform the fault protection circuit of the switching node, output capacitor or voltage output terminal being short circuit to ground.

For voltage divider resistor open circuit protection, when the voltage at the switching node increases to an over-voltage threshold, the over-voltage protection circuit turns on the power switch and signals the fault protection circuit to turn off the load disconnect switch, the current source provides a pre-charge current to charge the switching node after the fault protection circuit turns off the load disconnect switch, the timer counts the charge time during which the current source charges the switching node, and the fault protection circuit keeps the load disconnect switch off if the voltage at the switching node is greater than a first voltage threshold only after the charge time exceeds a time threshold and the feedback voltage is lower than a second voltage threshold.

For voltage divider resistor short circuit protection, when the feedback voltage is higher than a first voltage threshold, the third detector signals the over-voltage protection circuit to turn on the power switch and signal the fault protection circuit to turn off the load disconnect switch, the current source provides a pre-charge current to charge the switching node after the fault protection circuit turns off the load disconnect switch, the timer counts the charge time during which the current source charges the switching node, and the fault protection circuit keeps the load disconnect switch off if the voltage at the switching node is greater than a second voltage threshold only after the charge time exceeds a time threshold and the feedback voltage is greater than a third voltage threshold.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 3:
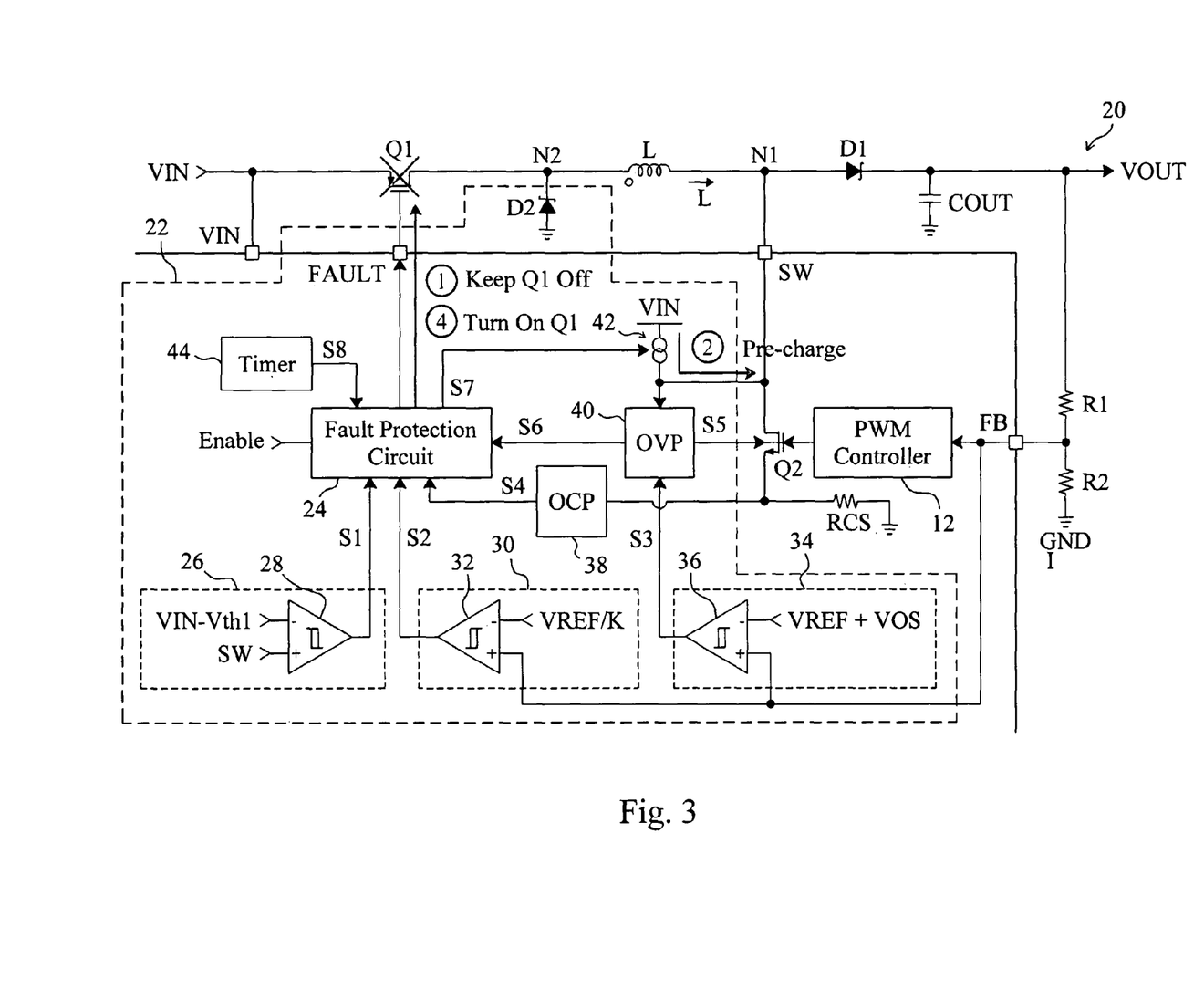
FIG. 3 is a circuit diagram of an embodiment according to the present invention.

FIG. 3 is a circuit diagram of an embodiment according to the present invention based on the conventional boost converter 10 shown in FIG. 1, in which a boost converter 20 includes a protection apparatus 22 to provide open circuit and short circuit protection for the boost converter 20. The protection apparatus 22 monitors the voltage at the switching node N1 and the output voltage VOUT for open circuit and short circuit detection. If open circuit or short circuit is detected, the protection apparatus 22 will turn off the load disconnect switch Q1. The protection apparatus 22 includes a fault protection circuit 24 connected to the load disconnect switch Q1 to switch the load disconnect switch Q1. The voltage at the switching node N1 is monitored by monitoring the voltage of the switching pin SW which is connected to the switching node N1, and the output voltage VOUT is monitored by monitoring the feedback voltage FB produced by the voltage divider composed of resistors R1 and R2. To monitor the voltage of the switching pin SW, a detector 26 includes a comparator 28 having an input terminal connected to the switching pin SW and comparing the voltage of the switching pin SW with a voltage threshold VIN−Vth1 to determine a comparison signal S1. To monitor the output voltage VOUT, a detector 30 includes a comparator 32 having an input terminal connected to the feedback pin FB and comparing the feedback voltage FB with a voltage threshold VREF/K to determine a comparison signal S2, and a detector 34 includes a comparator 36 having an input terminal connected to the feedback pin FB and comparing the feedback voltage FB with a voltage threshold VREF+VOS to determine a comparison signal S3. In this embodiment, the comparators 28, 32 and 36 are hysteresis comparators; however, in other embodiments, general or other type comparators may be used instead. An over-current protection (OCP) circuit 38 is connected to the power switch Q2 to detect the current in the power switch Q2 to determine an over-current signal S4. An over-voltage protection (OVP) circuit 40 is connected to the switching pin SW to detect the voltage of the switching pin SW, and provides over-voltage signals S5 and S6 for the power switch Q2 and fault protection circuit 24, respectively. A current source 42 is connected to the switching pin SW and fault protection circuit 24, responsive to a pre-charge signal S7 provided by the fault protection circuit 24, to provide a pre-charge current to charge the switching pin SW, and a timer 44 counts the charge time during which the current source 42 charges the switching pin SW.

As illustrated by the steps denoted with circled numerals 1-4 shown in FIG. 3, when the boost converter 20 starts up, responsive to an enable signal Enable, the fault protection circuit 24 will keep the load disconnect switch Q1 off, and signal the current source 42 to charge the switching pin SW. Either the detector 26 or the over-voltage protection circuit 40 monitors the voltage of the switching pin SW during this time period. Once the voltage of the switching pin SW becomes greater than a voltage threshold which is close to the input voltage VIN, the fault protection circuit 24 will turn on the load disconnect switch Q1. The inrush of the inductor current IL at start-up is reduced or eliminated since the load disconnect switch Q1 is turned on only after the voltage of the switching pin SW increases to close to the input voltage VIN.

Figure 4:
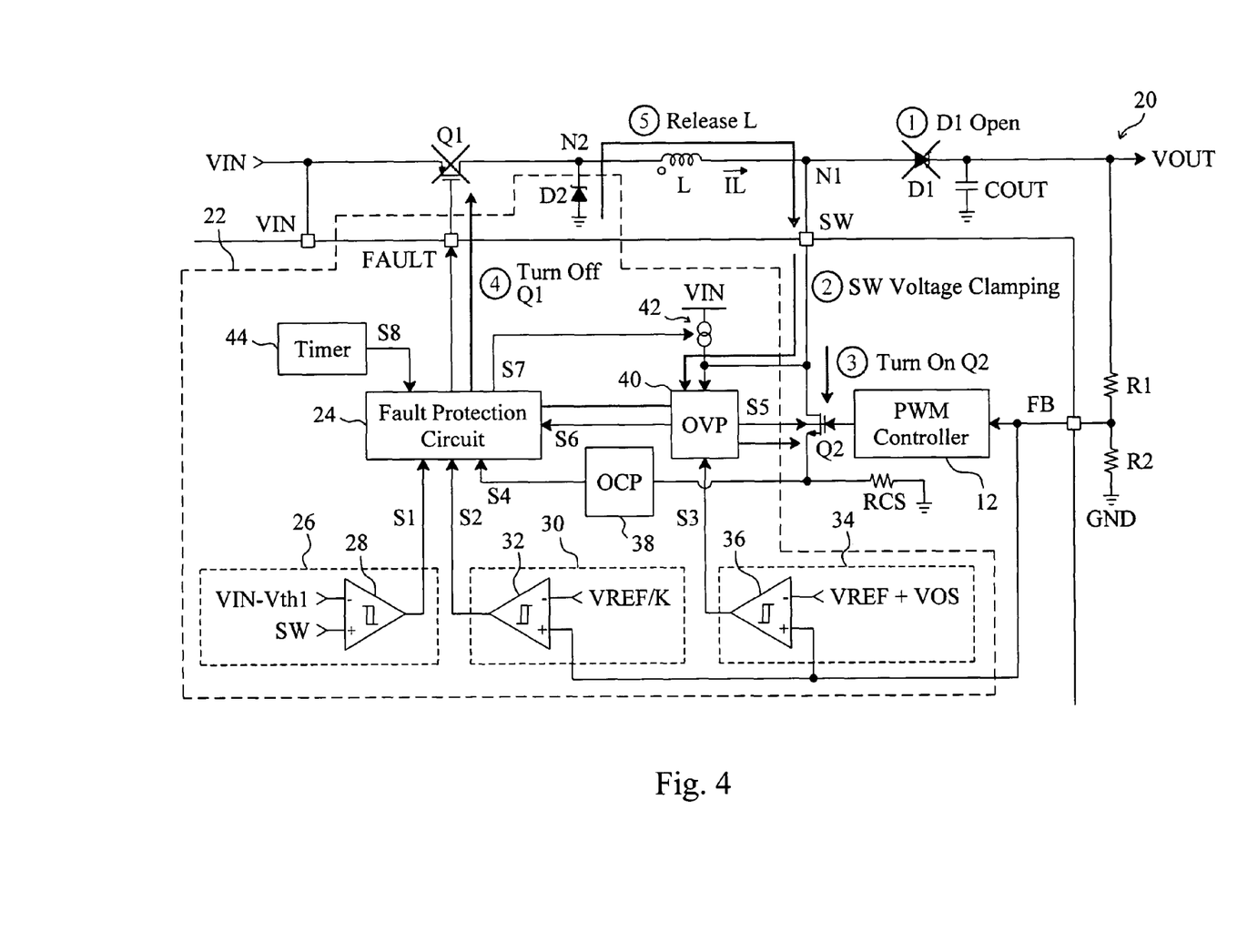
FIG. 4 is a circuit diagram showing an operation when diode open circuit occurs in the boost converter of FIG. 3.

FIG. 4 is a circuit diagram showing an operation when the diode D1 becomes open circuit, and the circled numerals denote the steps of the process. At the moment the diode D1 becomes open circuit, the voltage of the switching pin SW will increase abruptly, but will be clamped by the over-voltage protection circuit 40 not greater than an over-voltage threshold. When the voltage of the switching pin SW increases to the over-voltage threshold, the over-voltage protection circuit 40 asserts the signal S5 to turn on the power switch Q2, and thereby the switching pin SW is grounded through the power switch Q2 and a current sense resistor RCS. Responsive to this over-voltage condition, the overvoltage protection circuit 40 also asserts the signal S6 to signal the fault protection circuit 24 to turn off the load disconnect switch Q1. The protection apparatus 22 includes a diode D2 connected between a node N2 and ground, and the node N2 is between the load disconnect switch Q1 and inductor L. The diode D2 may establish a current path after the load disconnect switch Q1 is turned off, and thus energy in the inductor L is released to ground through the power switch Q2 and current sense resistor RCS.

Figure 5:
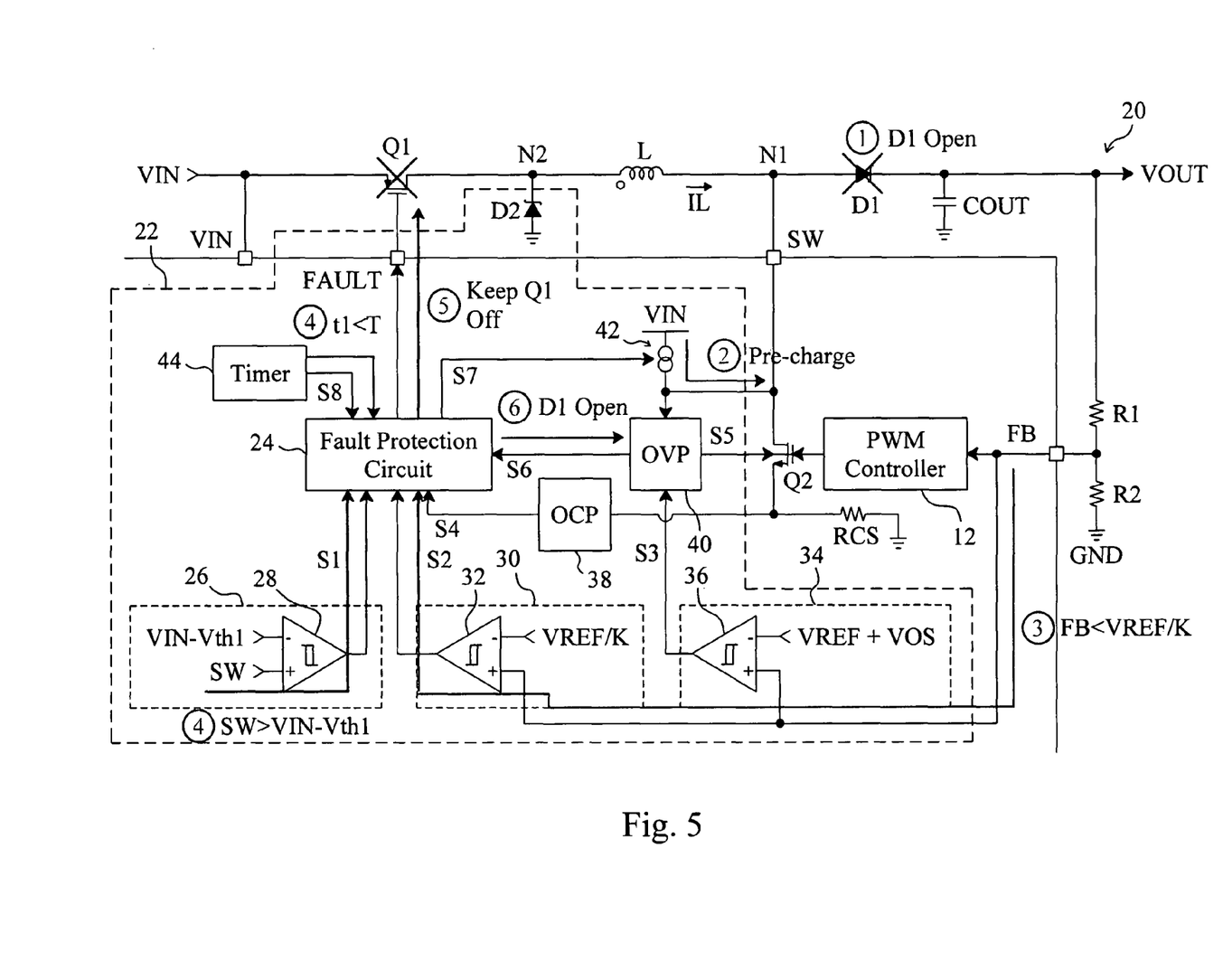
FIG. 5 is a circuit diagram showing an operation of confirmation of diode open circuit occurrence in the boost converter of FIG. 3.

FIG. 5 is a circuit diagram showing an operation of confirmation that the diode D1 has been open circuit. After the load disconnect switch Q1 is turned off as shown in FIG. 4, the fault protection circuit 24 signals the current source 42 to provide a pre-charge current to charge the switching pin SW, the timer 44 starts to count the charge time t1 during which the current source 42 charges the switching pin SW, the comparator 28 monitors the voltage of the switching pin SW, and the comparator 32 monitors the feedback voltage FB. Before the charge time t1 reaches a time threshold T, if the voltage of the switching pin SW is greater than the voltage threshold VIN−Vth1, and the feedback voltage FB is lower than the voltage threshold VREF/K, the fault protection circuit 24 will keep the load disconnect switch Q1 off and recognize that the diode D1 has been open circuit.

Figure 6:
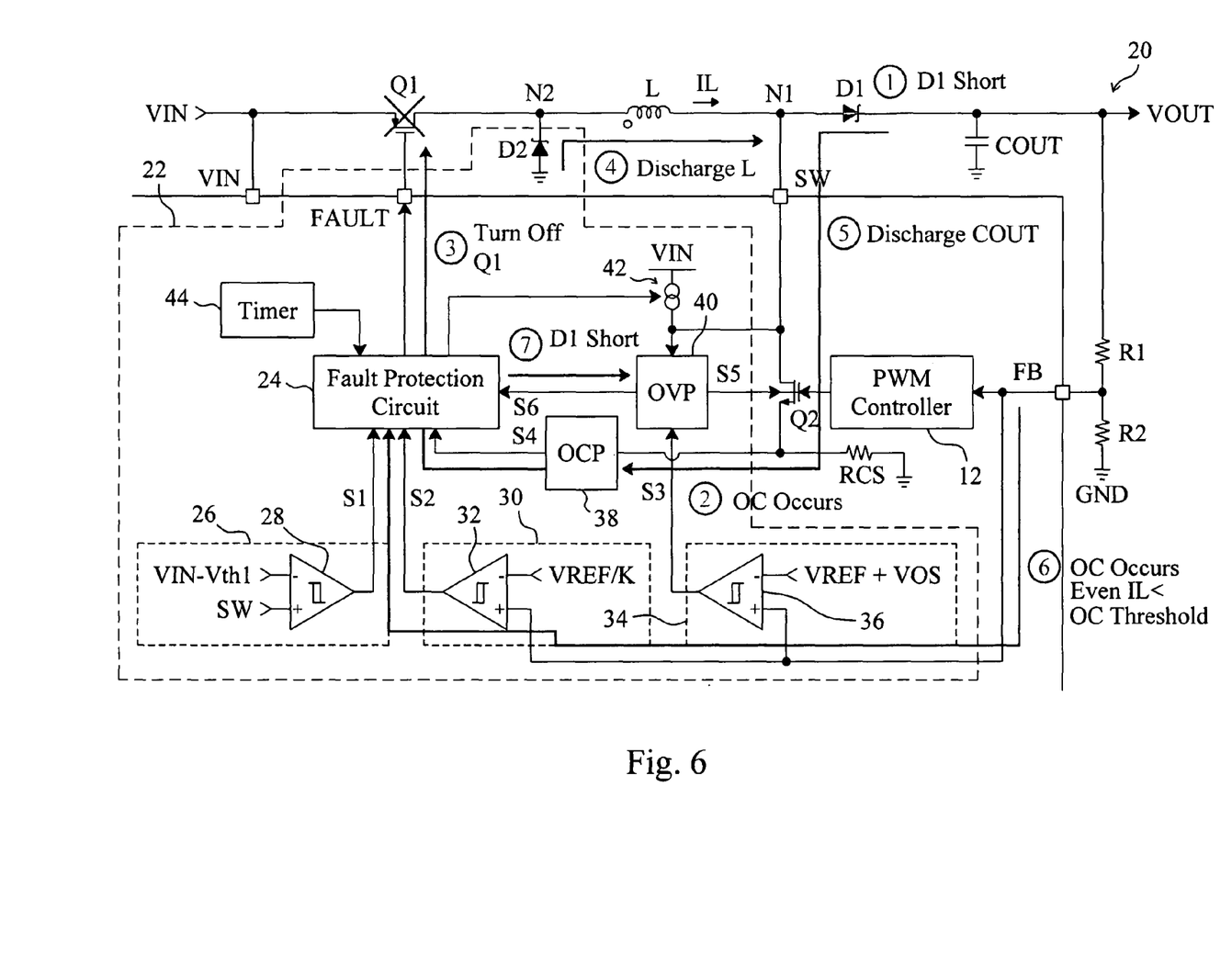
FIG. 6 is a circuit diagram showing an operation when diode short circuit occurs in the boost converter of FIG. 3.

FIG. 6 is a circuit diagram showing an operation when the diode D1 becomes short circuit, and the circled numerals denote the steps of the process. If the diode D1 is short during the power switch Q2 is on, reverse current will be produced which flows from the output capacitor COUT to the switching node N1. As soon as the over-current protection circuit 38 detects that the current in the power switch Q2 exceeds an over-current threshold, it will assert the over-current signal S4 to signal the fault protection circuit 24 to turn off the load disconnect switch Q1. After the load disconnect switch Q1 is turned off, the inductor L will discharge. Since the diode D1 is short now, the output capacitor COUT will keep discharging to ground through the power switch Q2 and current sense resistor RCS, so that the feedback voltage FB continues decreasing. Once the comparator 32 detects that the feedback voltage FB becomes lower than the voltage threshold VREF/K, the fault protection circuit 24 recognizes that the diode D1 has been short circuit.

Figure 7:
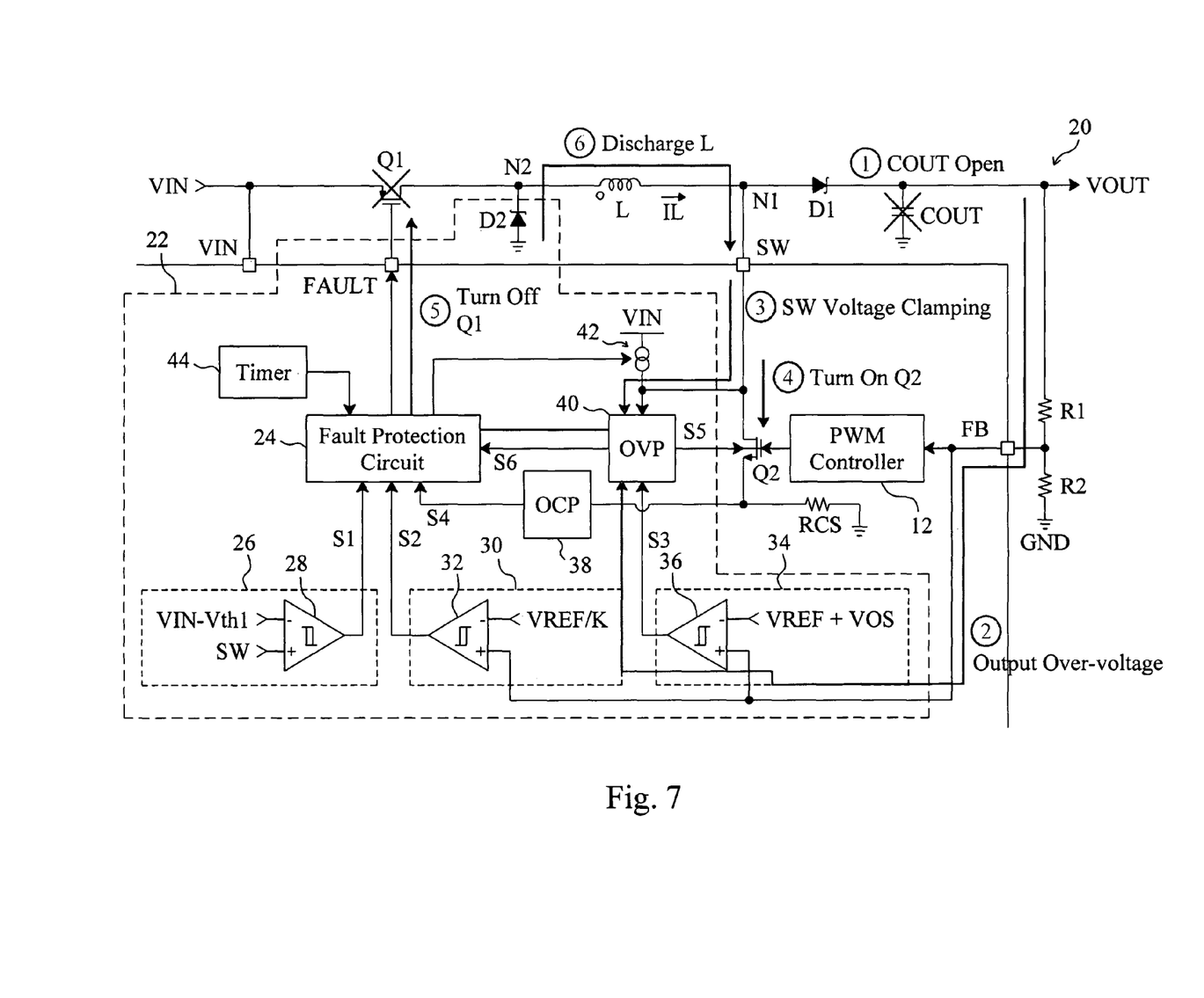
FIG. 7 is a circuit diagram showing an operation when output capacitor open circuit occurs in the boost converter of FIG. 3.

FIG. 7 is a circuit diagram showing an operation when the output capacitor COUT becomes open circuit, and the circled numerals denote the steps of the process. During the power switch Q2 is off, if the output capacitor COUT becomes open circuit, the output voltage VOUT and the voltage of the switching pin SW will increase, and when the comparator 36 detects that the output voltage VOUT becomes greater than the voltage threshold VREF+VOS, or when the over-voltage protection circuit 40 detects that the voltage of the switching pin SW increases to an over-voltage threshold, the over-voltage protection circuit 40 will assert the signal S5 to turn on the power switch Q2, thereby releasing energy from the switching pin SW to ground, and signal the fault protection circuit 24 to turn off the load disconnect switch Q1. After the load disconnect switch Q1 is turned off, the inductor L will discharge.

Figure 8:
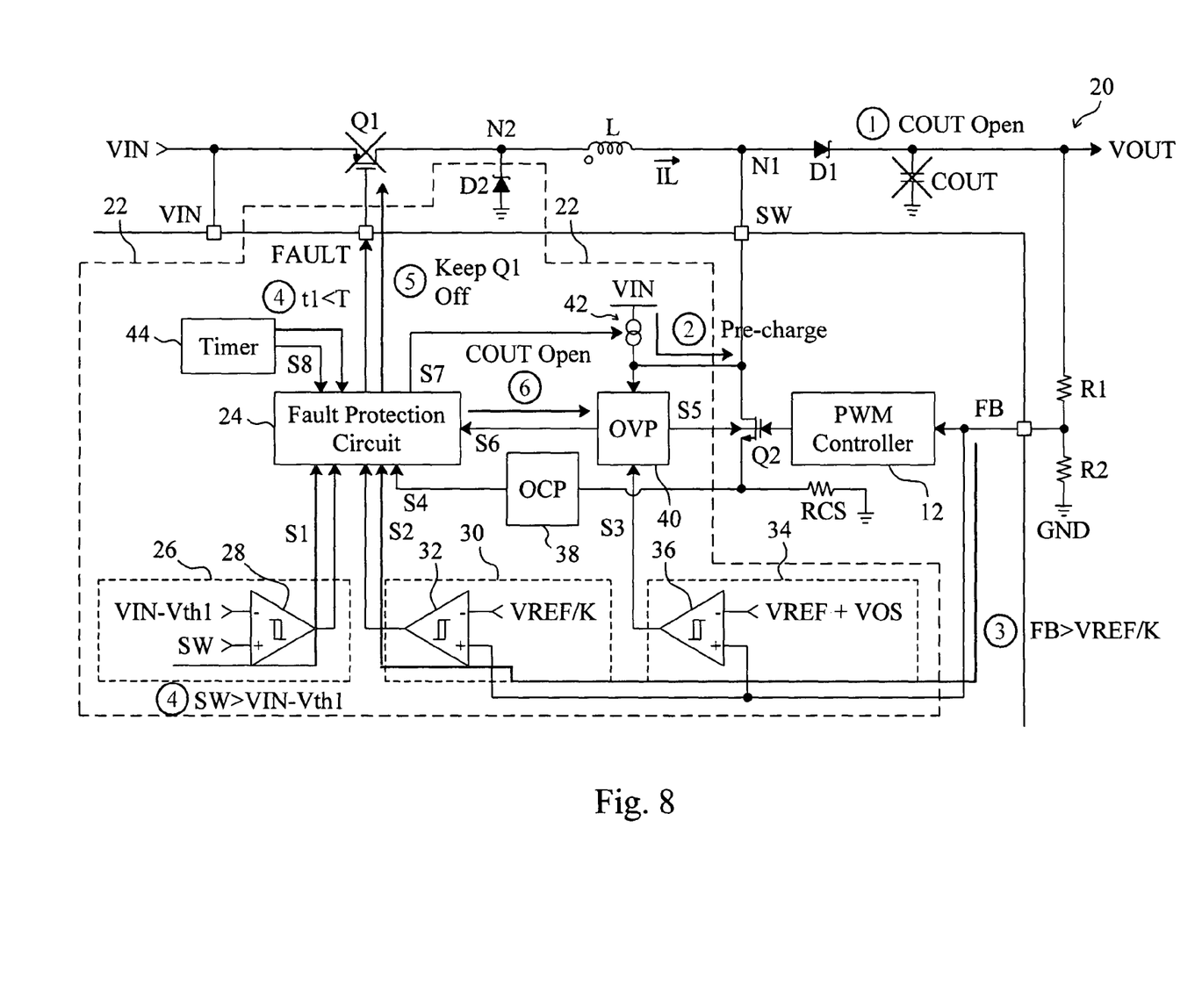
FIG. 8 is a circuit diagram showing an operation of confirmation of output capacitor open circuit occurrence in the boost converter of FIG. 3.

FIG. 8 is a circuit diagram showing an operation of confirmation that the output capacitor COUT has been open circuit, and the circled numerals denote the steps of the process. After the inductor L discharges as shown in FIG. 7, the fault protection circuit 24 signals the current source 42 to provide a pre-charge current to charge the switching pin SW, and the timer 44 starts to count the charge time t1 during which the switching pin SW is charged. Before the charge time t1 reaches a time threshold T, if the comparator 32 detects that the feedback voltage FB is higher than the voltage threshold VREF/K, and the voltage of the switching pin SW is higher than the voltage threshold VIN−Vth1, the fault protection circuit 24 will keep the load disconnect switch Q1 off and recognize that the output capacitor COUT has been open circuit.

Figure 9:
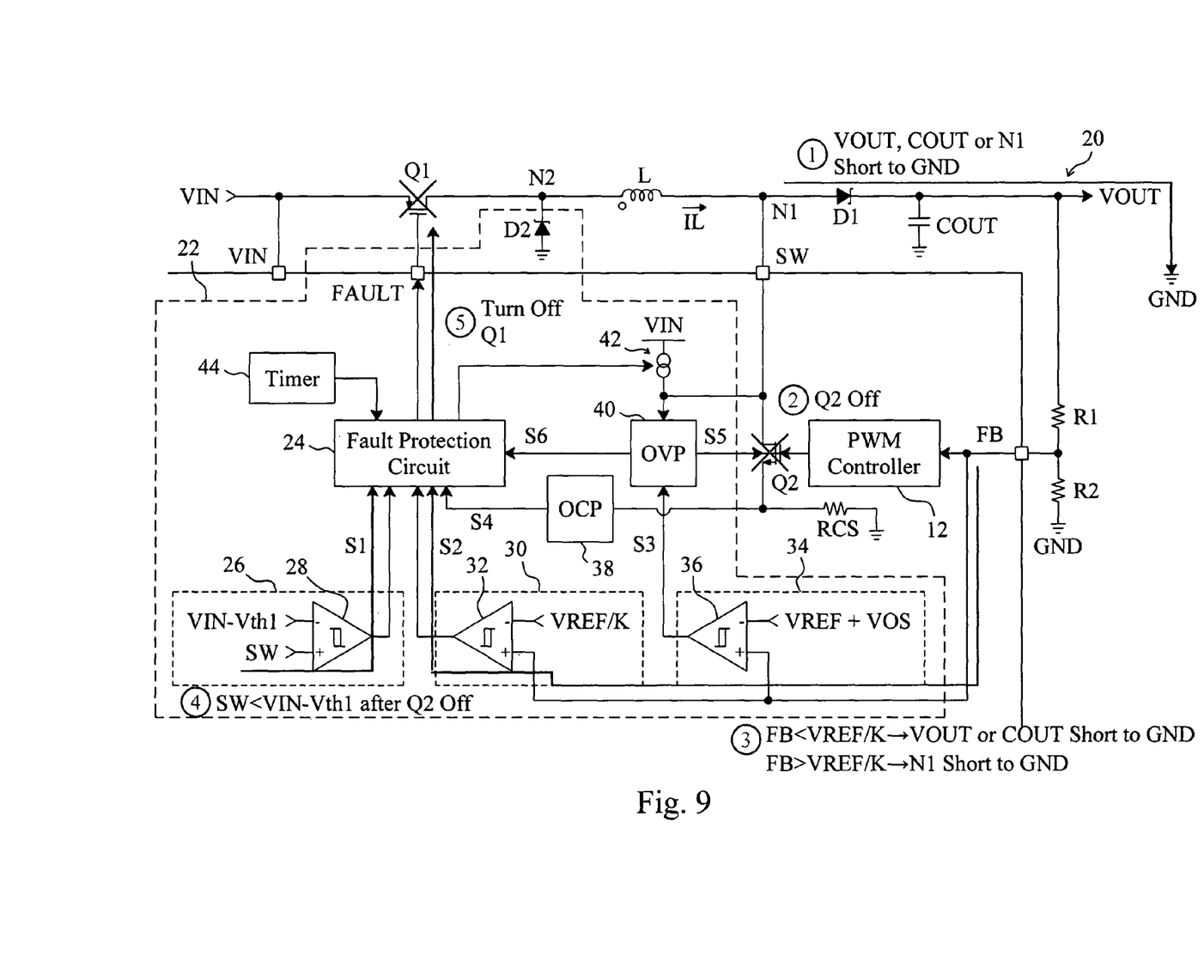
FIG. 9 is a circuit diagram showing an operation when the voltage output terminal, output capacitor, or switching pin in the boost converter of FIG. 3 becomes short circuit.

FIG. 9 is a circuit diagram showing an operation when the voltage output terminal VOUT, the output capacitor COUT, or the switching pin SW becomes short circuit to ground, and the circled numerals denote the steps of the process. During the power switch Q2 is off, if the comparator 28 detects that the voltage of the switching pin SW is lower than the voltage threshold VIN−Vth1, and the comparator 32 detects that the feedback voltage FB is lower than the voltage threshold VERF/K, the fault protection circuit 24 will turn off the load disconnect switch Q1 and recognize that the voltage output terminal VOUT or the output capacitor COUT has been short circuit to ground; or, in another case, if the comparator 28 detects that the voltage of the switching pin SW is lower than the voltage threshold VIN−Vth1, and the comparator 32 detects that the feedback voltage FB is higher than the voltage threshold VREF/K, the fault protection circuit 24 will turn off the load disconnect switch Q1 and recognize that the switching node N1 has been short circuit to ground.

Figure 10:
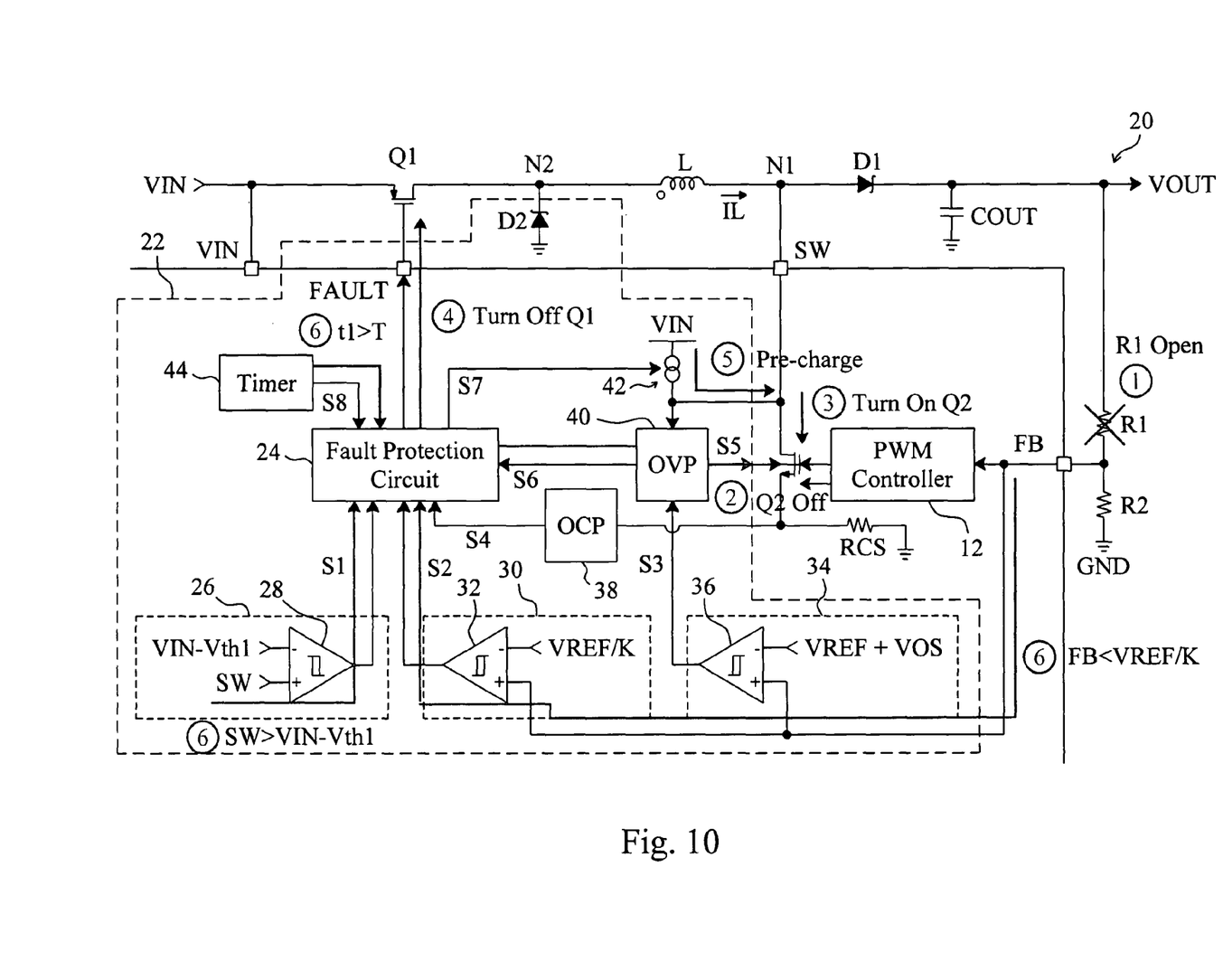
FIG. 10 is a circuit diagram showing an operation when voltage divider resistor open circuit occurs in the boost converter of FIG. 3.

FIG. 10 is a circuit diagram showing an operation when the voltage divider resistor R1 becomes open circuit, and the circled numerals denote the steps of the process. When the voltage divider resistor R4 is open, the feedback voltage FB will be zero and therefore the PWM controller 12 will keep the power switch Q2 off, causing the output voltage VOUT continuously increasing. Once the voltage of the switching pin SW becomes higher than an over-voltage threshold, the over-voltage protection circuit 40 asserts not only the signal S5 to turn on the power switch Q2, but also the signal S6 to signal the fault protection circuit 24 to turn off the load disconnect switch Q1. Then, the fault protection circuit 24 signals the current source 42 to provide a pre-charge current to charge the switching pin SW, and the timer 44 starts to count the charge time t1 during which the switching pin SW is charged. If the comparator 28 detects that the voltage of the switching pin SW is greater than the voltage threshold VIN−Vth1 only after the charge time t1 exceeds a time threshold T, and the comparator 32 detects that the feedback voltage FB is lower than the voltage threshold VREF/K, the fault protection circuit 24 will keep the load disconnect switch Q1 off and recognize that the voltage divider resistor R1 has been open circuit.

Figure 11:
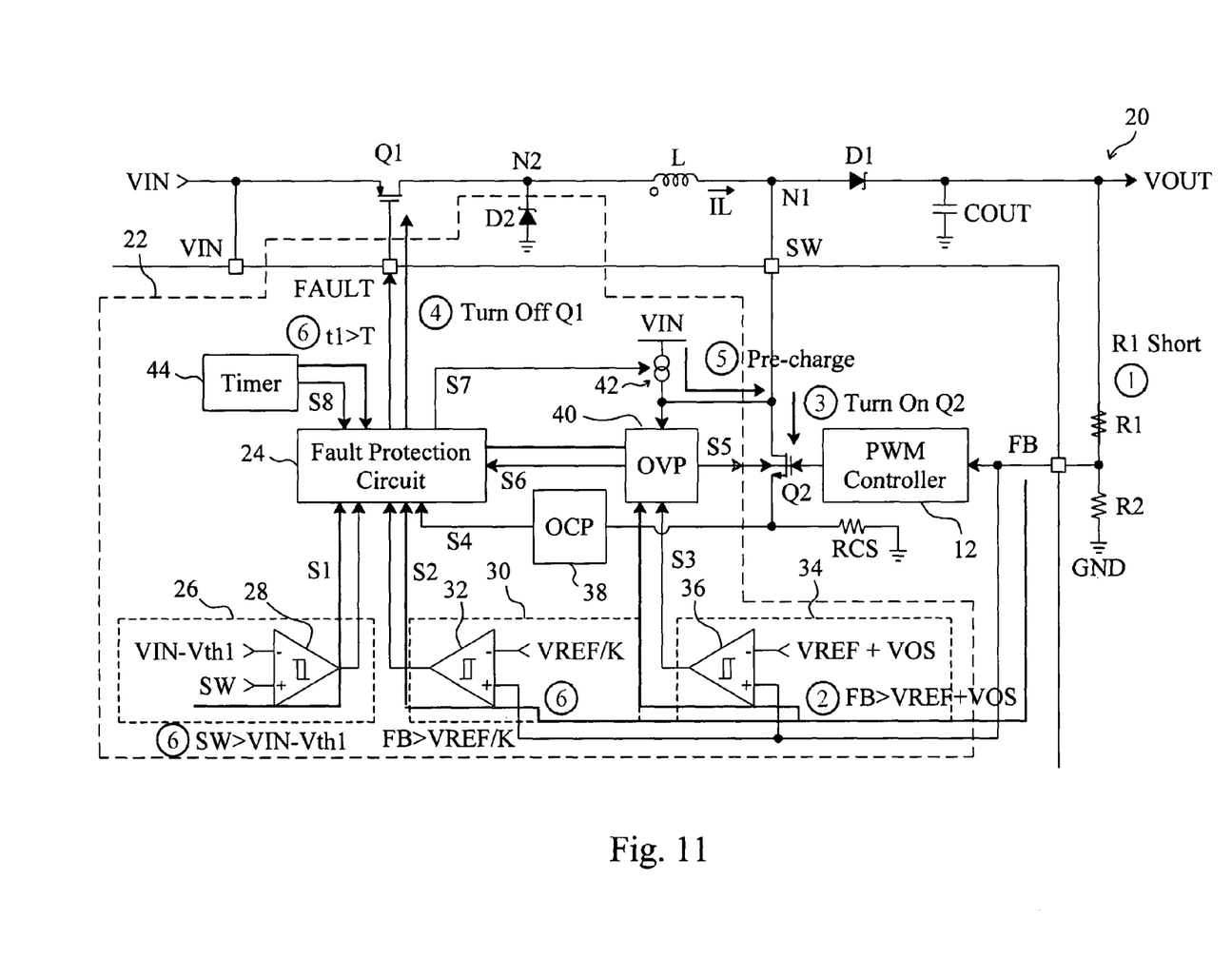
FIG. 11 is a circuit diagram showing an operation when voltage divider resistor short circuit occurs in the boost converter of FIG. 3.

FIG. 11 is a circuit diagram showing an operation when the voltage divider resistor R1 becomes short circuit, and the circled numerals denote the steps of the process. When the voltage divider resistor R1 is short, the comparator 36 will detect that the feedback voltage FB is higher than the voltage threshold VREF+VOS, and therefore the comparator 36 will trigger the signal S3 to signal the over-voltage protection circuit 40 to assert the signal S5 to turn on the power switch Q2 and the signal S6 to signal the fault protection circuit 24 to turn off the load disconnect switch Q1. Then, the fault protection circuit 24 signals the current source 42 to provide a pre-charge current to charge the switching pin SW, and the timer 44 starts to count the charge time t1 during which the switching pin SW is charged. If the comparator 28 detects that the voltage of the switching pin SW is greater than the voltage threshold VIN−Vth1 only after the charge time t1 exceeds a time threshold T, and the comparator 32 detects that the feedback voltage FB is higher than the voltage threshold VREF/K, the fault protection circuit 24 will keep the load disconnect switch Q1 off and recognize that the voltage divider resistor R4 has been short circuit.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A protection apparatus for a boost converter including a load disconnect switch connected between a voltage input terminal and an inductor, a power switch connected to the inductor by a switching node, a diode connected between the switching node and a voltage output terminal, and an output capacitor connected to the voltage output terminal to provide an output voltage, the protection apparatus comprising:
    a fault protection circuit connected to the load disconnect switch, for switching the load disconnect switch; and
    a current source connected to the switching node and fault protection circuit;
    wherein the fault protection circuit keeps the load disconnect switch off and signals the current source to provide a pre-charge current to charge the switching node when the boost converter starts up, and turns on the load disconnect switch when the voltage at the switching node becomes greater than a voltage threshold.

2. A protection method for a boost converter including a load disconnect switch connected between a voltage input terminal and an inductor, a power switch connected to the inductor by a switching node, a diode connected between the switching node and a voltage output terminal, and an output capacitor connected to the voltage output terminal to provide an output voltage, the protection method comprising the steps of:
    keeping the load disconnect switch off when the boost converter starts up;
    charging the switching node;
    monitoring a voltage at the switching node; and
    turning on the load disconnect switch when the voltage at the switching node becomes greater than a voltage threshold.

3. A protection apparatus for a boost converter including a load disconnect switch connected between a voltage input terminal and an inductor, a power switch connected to the inductor by a switching node, a diode connected between the switching node and a voltage output terminal, and an output capacitor connected to the voltage output terminal to provide an output voltage, the protection apparatus comprising:
    a fault protection circuit connected to the load disconnect switch, for switching the load disconnect switch; and
    an over-voltage protection circuit connected to the switching node, power switch and fault protection circuit;
    wherein the over-voltage protection circuit monitors a voltage at the switching node and when the voltage at the switching node becomes higher than an over-voltage threshold, the over-voltage protection circuit turns on the power switch and signals the fault protection circuit to turn off the load disconnect switch.

4. The protection apparatus of claim 3, further comprising:
    a current source connected to the switching node and fault protection circuit, for providing a pre-charge current to charge the switching node after the fault protection circuit turns off the load disconnect switch;
    a timer connected to the fault protection circuit, for counting a charge time during which the current source charges the switching node;
    a first detector connected to the switching node and fault protection circuit, for monitoring the voltage at the switching node;
    a second detector connected to the fault protection circuit, for monitoring a feedback voltage related to the output voltage;
    wherein before the charge time reaches a time threshold, if the voltage at the switching node is greater than a first voltage threshold, and the feedback voltage is lower than a second voltage threshold, the fault protection circuit will keep the load disconnect switch off.

5. The protection apparatus of claim 4, wherein the first detector comprises a comparator for comparing the voltage at the switching node with the first voltage threshold to assert a comparison signal to signal the fault protection circuit.

6. The protection apparatus of claim 4, wherein the second detector comprises a comparator for comparing the feedback voltage with the second voltage threshold to assert a comparison signal to signal the fault protection circuit.

7. A protection method for a boost converter including a load disconnect switch connected between a voltage input terminal and an inductor, a power switch connected to the inductor by a switching node, a diode connected between the switching node and a voltage output terminal, and an output capacitor connected to the voltage output terminal to provide an output voltage, the protection method comprising the steps of:
    monitoring a voltage at the switching node; and
    when the voltage at the switching node becomes higher than an over-voltage threshold, turning on the power switch and turning off the load disconnect switch.

8. The protection method of claim 7, further comprising the steps of:
    charging the switching node after turning off the load disconnect switch;
    counting a charge time during which the switching node is charged;
    monitoring the voltage at the switching node and a feedback voltage related to the output voltage; and
    keeping the load disconnect switch off if, before the charge time reaches a time threshold, the voltage at the switching node is greater than a first voltage threshold, and the feedback voltage is lower than a second voltage threshold.

9. A protection apparatus for a boost converter including a load disconnect switch connected between a voltage input terminal and an inductor, a power switch connected to the inductor by a switching node, a diode connected between the switching node and a voltage output terminal, and an output capacitor connected to the voltage output terminal to provide an output voltage, the protection apparatus comprising:
    a fault protection circuit connected to the load disconnect switch, for switching the load disconnect switch;
    an over-current protection circuit connected to the power switch, for monitoring a current in the power switch;
    a detector connected to the fault protection circuit, for monitoring a feedback voltage related to the output voltage;
    wherein the over-current protection circuit signals the fault protection circuit to turn off the load disconnect switch when the current in the power switch becomes greater than an over-current threshold, and after the fault protection circuit turns off the load disconnect switch, the detector will signal the fault protection circuit to keep the load disconnect switch off when the feedback voltage becomes lower than a voltage threshold.

10. The protection apparatus of claim 9, wherein the detector comprises a comparator for comparing the feedback voltage with the voltage threshold to assert a comparison signal to signal the fault protection circuit.

11. A protection method for a boost converter including a load disconnect switch connected between a voltage input terminal and an inductor, a power switch connected to the inductor by a switching node, a diode connected between the switching node and a voltage output terminal, and an output capacitor connected to the voltage output terminal to provide an output voltage, the protection method comprising the steps of:
  monitoring a current in the power switch;
  turning off the load disconnect switch when the current in the power switch becomes greater than an over-current threshold;
  after the load disconnect switch is turned off, monitoring a feedback voltage related to the output voltage; and
  when the feedback voltage becomes lower than a voltage threshold, keeping the load disconnect switch off.

12. A protection apparatus for a boost converter including a load disconnect switch connected between a voltage input terminal and an inductor, a power switch connected to the inductor by a switching node, a diode connected between the switching node and a voltage output terminal, and an output capacitor connected to the voltage output terminal to provide an output voltage, the protection apparatus comprising:
  a fault protection circuit connected to the load disconnect switch, for switching the load disconnect switch;
  an over-voltage protection circuit connected to the switching node, power switch and fault protection circuit, for monitoring a voltage at the switching node during the power switch is off; and
  a detector connected to the over-voltage protection circuit, for monitoring a feedback voltage related to the output voltage during the power switch is off;
  wherein the over-voltage protection circuit turns on the power switch and signals the fault protection circuit to turn off the load disconnect switch when the voltage at the switching node increases to an over-voltage threshold or the feedback voltage becomes higher than a voltage threshold.

13. The protection apparatus of claim 12, wherein the detector comprises a comparator for comparing the feedback voltage with the voltage threshold to assert a comparison signal to signal the over-voltage protection circuit.

14. The protection apparatus of claim 12, further comprising:
  a current source connected to the switching node and fault protection circuit, for providing a pre-charge current to charge the switching node after the fault protection circuit turns off the load disconnect switch;
  a timer connected to the fault protection circuit, for counting a charge time during which the current source charges the switching node;
  a second detector connected to the switching node and fault protection circuit, for monitoring the voltage at the switching node;
  a third detector connected to the fault protection circuit, for monitoring the feedback voltage;
  wherein if, before the charge time reaches a time threshold, the voltage at the switching node is greater than a second voltage threshold and the feedback voltage is greater than a third voltage threshold, the fault protection circuit will keep the load disconnect switch off.

15. The protection apparatus of claim 14, wherein the second detector comprises a comparator for comparing the voltage at the switching node with the second voltage threshold to assert a comparison signal to signal the fault protection circuit.

16. The protection apparatus of claim 14, wherein the third detector comprises a comparator for comparing the feedback voltage with the third voltage threshold to assert a comparison signal to signal the fault protection circuit.

17. A protection method for a boost converter including a load disconnect switch connected between a voltage input terminal and an inductor, a power switch connected to the inductor by a switching node, a diode connected between the switching node and a voltage output terminal, and an output capacitor connected to the voltage output terminal to provide an output voltage, the protection method comprising the steps of:
  monitoring a voltage at the switching node during the power switch is off;
  monitoring a feedback voltage related to the output voltage during the power switch is off; and
  when the voltage at the switching node increases to an over-voltage threshold or the feedback voltage becomes higher than a voltage threshold, turning on the power switch and turning off the load disconnect switch.

18. The protection method of claim 17, further comprising the steps of:
  charging the switching node after turning off the load disconnect switch;
  counting a charge time during which the switching node is charged;
  monitoring the voltage at the switching node and the feedback voltage; and
  if, before the charge time reaches a time threshold, the voltage at the switching node is greater than a second voltage threshold and the feedback voltage is greater than a third voltage threshold, keeping the load disconnect switch off.

19. A protection apparatus for a boost converter including a load disconnect switch connected between a voltage input terminal and an inductor, a power switch connected to the inductor by a switching node, a diode connected between the switching node and a voltage output terminal, and an output capacitor connected to the voltage output terminal to provide an output voltage, the protection apparatus comprising:
  a fault protection circuit connected to the load disconnect switch, for switching the load disconnect switch;
  a first detector connected to the switching node and fault protection circuit, for monitoring a voltage at the switching node and when the voltage at the switching node is lower than a voltage threshold during the power switch is off, signaling the fault protection circuit to turn off the load disconnect switch; and
  a second detector connected to the fault protection circuit, for monitoring a feedback voltage related to the output voltage, to inform the fault protection circuit of the switching node, output capacitor or voltage output terminal being short circuit to ground when the voltage at the switching node is lower than the voltage threshold during the power switch is off.

20. The protection apparatus of claim 19, wherein the first detector comprises a comparator for comparing the voltage at the switching node with the voltage threshold to assert a comparison signal to signal the fault protection circuit.

21. The protection apparatus of claim 19, wherein the second detector comprises a comparator for comparing the feedback voltage with a second voltage threshold to identify short circuit to ground happened to the switching node, output capacitor or voltage output terminal.

22. A protection method for a boost converter including a load disconnect switch connected between a voltage input terminal and an inductor, a power switch connected to the inductor by a switching node, a diode connected between the switching node and a voltage output terminal, and an output capacitor connected to the voltage output terminal to provide an output voltage, the protection method comprising the steps of:
- monitoring a voltage at the switching node during the power switch is off;
- monitoring a feedback voltage related to the output voltage during the power switch is off;
- turning off the load disconnect switch when the voltage at the switching node is lower than a first voltage threshold; and
- when the voltage at the switching node is lower than the first voltage threshold, comparing the feedback voltage with a second voltage threshold to identify short circuit to ground happened to the switching node, output capacitor or voltage output terminal.

23. A protection apparatus for a boost converter including a load disconnect switch connected between a voltage input terminal and an inductor, a power switch connected to the inductor by a switching node, a diode connected between the switching node and a voltage output terminal, an output capacitor connected to the voltage output terminal to provide an output voltage, and a resistor voltage divider connected to the voltage output terminal to produce a feedback voltage, the protection apparatus comprising:
- a fault protection circuit connected to the load disconnect switch, for switching the load disconnect switch;
- an over-voltage protection circuit connected to the switching node, power switch and fault protection circuit, for monitoring a voltage at the switching node and when the voltage at the switching node increases to an over-voltage threshold, turning on the power switch and signaling the fault protection circuit to turn off the load disconnect switch;
- a current source connected to the switching node and fault protection circuit, for providing a pre-charge current to charge the switching node after the fault protection circuit turns off the load disconnect switch;
- a timer connected to the fault protection circuit, for counting a charge time during which the current source charges the switching node;
- a first detector connected to the switching node and fault protection circuit, for monitoring the voltage at the switching node; and
- a second detector connected to the resistor voltage divider and fault protection circuit, for monitoring the feedback voltage;
- wherein the fault protection circuit will keep the load disconnect switch off if the voltage at the switching node is greater than a first voltage threshold only after the charge time exceeds a time threshold and the feedback voltage is lower than a second voltage threshold.

24. The protection apparatus of claim 23, wherein the first detector comprises a comparator for comparing the voltage at the switching node with the first voltage threshold to assert a comparison signal to signal the fault protection circuit.

25. The protection apparatus of claim 23, wherein the second detector comprises a comparator for comparing the feedback voltage with the second voltage threshold to assert a comparison signal to signal the fault protection circuit.

26. A protection method for a boost converter including a load disconnect switch connected between a voltage input terminal and an inductor, a power switch connected to the inductor by a switching node, a diode connected between the switching node and a voltage output terminal, an output capacitor connected to the voltage output terminal to provide an output voltage, and a resistor voltage divider connected to the voltage output terminal to produce a feedback voltage, the protection method comprising the steps of:
- monitoring a voltage at the switching node;
- when the voltage at the switching node increases to an over-voltage threshold, turning on the power switch and turning off the load disconnect switch;
- charging the switching node after the load disconnect switch is turned off;
- counting a charge time during which the switching node is charged;
- monitoring the feedback voltage after the load disconnect switch is turned off; and
- keeping the load disconnect switch off if the voltage at the switching node is greater than a first voltage threshold only after the charge time exceeds a time threshold and the feedback voltage is lower than a second voltage threshold.

27. A protection apparatus for a boost converter including a load disconnect switch connected between a voltage input terminal and an inductor, a power switch connected to the inductor by a switching node, a diode connected between the switching node and a voltage output terminal, an output capacitor connected to the voltage output terminal to provide an output voltage, and a resistor voltage divider connected to the voltage output terminal to produce a feedback voltage, the protection apparatus comprising:
- a fault protection circuit connected to the load disconnect switch, for switching the load disconnect switch;
- an over-voltage protection circuit connected to the switching node, power switch and fault protection circuit;
- a first detector connected to the resistor voltage divider and over-voltage protection circuit, for monitoring the feedback voltage and when the feedback voltage is higher than a first voltage threshold, signaling the over-voltage protection circuit to turn on the power switch and signal the fault protection circuit to turn off the load disconnect switch;
- a current source connected to the switching node and fault protection circuit, for providing a pre-charge current to charge the switching node after the fault protection circuit turns off the load disconnect switch;
- a timer connected to the fault protection circuit, for counting a charge time during which the current source charges the switching node;
- a second detector connected to the switching node and fault protection circuit, for monitoring a voltage at the switching node; and
- a third detector connected to the resistor voltage divider and fault protection circuit, for monitoring the feedback voltage;
- wherein the fault protection circuit will keep the load disconnect switch off if the voltage at the switching node is greater than a second voltage threshold only after the charge time exceeds a time threshold and the feedback voltage is greater than a third voltage threshold.

28. The protection apparatus of claim 27, wherein the first detector comprises a comparator for comparing the feedback voltage with the first voltage threshold to assert a comparison signal to signal the over-voltage protection circuit.

29. The protection apparatus of claim 27, wherein the second detector comprises a comparator for comparing the voltage at the switching node with the second voltage threshold to assert a comparison signal to signal the fault protection circuit.

30. The protection apparatus of claim 27, wherein the third detector comprises a comparator for comparing the feedback voltage with the third voltage threshold to assert a comparison signal to signal the fault protection circuit.

31. A protection method for a boost converter including a load disconnect switch connected between a voltage input terminal and an inductor, a power switch connected to the inductor by a switching node, a diode connected between the switching node and a voltage output terminal, an output capacitor connected to the voltage output terminal to provide an output voltage, and a resistor voltage divider connected to the voltage output terminal to produce a feedback voltage, the protection method comprising the steps of:

monitoring the feedback voltage;

when the feedback voltage is higher than a first voltage threshold, turning on the power switch and turning off the load disconnect switch;

charging the switching node after the load disconnect switch is turned off;

counting a charge time during which the switching node is charged; and monitoring a voltage at the switching node;

keeping the load disconnect switch off if the voltage at the switching node is greater than a second voltage threshold only after the charge time exceeds a time threshold and the feedback voltage is greater than a third voltage threshold.

* * * * *